(12) United States Patent
Nakayama

(10) Patent No.: US 12,456,175 B2
(45) Date of Patent: Oct. 28, 2025

(54) IMAGE PROCESSING DEVICE CAPABLE OF SYNTHESIZING IMAGES, IMAGE PROCESSING METHOD, AND STORAGE MEDIUM

(71) Applicant: CANON KABUSHIKI KAISHA, Tokyo (JP)

(72) Inventor: Fumitaka Nakayama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 336 days.

(21) Appl. No.: 18/299,236

(22) Filed: Apr. 12, 2023

(65) Prior Publication Data

US 2023/0342887 A1 Oct. 26, 2023

(30) Foreign Application Priority Data

Apr. 22, 2022 (JP) .................................. 2022-071171

(51) Int. Cl.
*G06T 5/70* (2024.01)
*G06T 5/20* (2006.01)
*G06T 5/50* (2006.01)

(52) U.S. Cl.
CPC .................. *G06T 5/70* (2024.01); *G06T 5/20* (2013.01); *G06T 5/50* (2013.01); *G06T 2207/20021* (2013.01); *G06T 2207/20221* (2013.01)

(58) Field of Classification Search
CPC .... G06T 5/70; G06T 5/20; G06T 5/50; G06T 2207/20021; G06T 2207/20221; G06T 2207/10052; H04N 5/265; H04N 5/213; H04N 5/911; H04N 23/6845
USPC .......................................... 382/264, 284, 275
See application file for complete search history.

(56) References Cited

U.S. PATENT DOCUMENTS

| | | | |
|---|---|---|---|
| 8,026,962 B2* | 9/2011 | Abe .......................... | G06T 5/50 |
| | | | 348/241 |
| 9,053,538 B2* | 6/2015 | Takahashi ................. | G06T 5/70 |
| 9,830,687 B2* | 11/2017 | Hanada .................. | G06T 3/4038 |
| 10,021,313 B1* | 7/2018 | Chen .................... | H04N 23/951 |
| 11,842,460 B1* | 12/2023 | Chen ......................... | G06T 5/60 |
| 2003/0202683 A1* | 10/2003 | Ma ................... | G08G 1/096725 |
| | | | 382/104 |

(Continued)

FOREIGN PATENT DOCUMENTS

| JP | 09-261526 A | 10/1997 |
| JP | 2012-068733 A | 4/2012 |
| JP | 20120068733 A | 4/2012 |

OTHER PUBLICATIONS

The above patent documents were cited in a United Kingdom Search Report issued on Nov. 14, 2023, which is enclosed, that issued in the corresponding UK Patent Application No. GB2305789.6.

*Primary Examiner* — Kathleen Y Dulaney
(74) *Attorney, Agent, or Firm* — Cowan, Liebowitz & Latman, P.C.

(57) ABSTRACT

An image processing device includes an acquisition unit configured to acquire a plurality of images, a calculation unit configured to calculate the amount of correlation between at least two images of the plurality of images, a synthesis unit configured to synthesize the plurality of images based on the correlation amount to generate a synthesized image, and a noise processing unit configured to reduce noise in the synthesized image based on the number of plurality of images and the correlation amount.

12 Claims, 12 Drawing Sheets

(56) References Cited

U.S. PATENT DOCUMENTS

| | | | |
|---|---|---|---|
| 2009/0185721 A1* | 7/2009 | Hiraga | G06T 5/20 382/107 |
| 2010/0260432 A1* | 10/2010 | Shimizu | G06T 5/20 382/255 |
| 2012/0070100 A1* | 3/2012 | Naito | H04N 23/6845 382/275 |
| 2013/0300901 A1* | 11/2013 | Hirai | H04N 25/134 348/242 |
| 2014/0321768 A1* | 10/2014 | Tsai | G06T 5/20 382/263 |
| 2015/0010247 A1* | 1/2015 | Tanaka | G06T 5/70 382/254 |
| 2015/0262341 A1* | 9/2015 | Nash | G06T 3/02 348/208.6 |
| 2016/0210731 A1* | 7/2016 | Hamada | G06T 5/70 |
| 2018/0253834 A1* | 9/2018 | Pouli | G06T 5/94 |
| 2019/0130533 A1* | 5/2019 | Ouyang | G06T 5/70 |
| 2019/0164256 A1* | 5/2019 | Ouyang | H04N 13/25 |
| 2020/0234080 A1* | 7/2020 | Ciller Ruiz | G06T 11/008 |
| 2020/0329187 A1* | 10/2020 | Huang | H04N 23/73 |
| 2023/0096541 A1* | 3/2023 | Takahashi | G06T 5/50 345/629 |

* cited by examiner

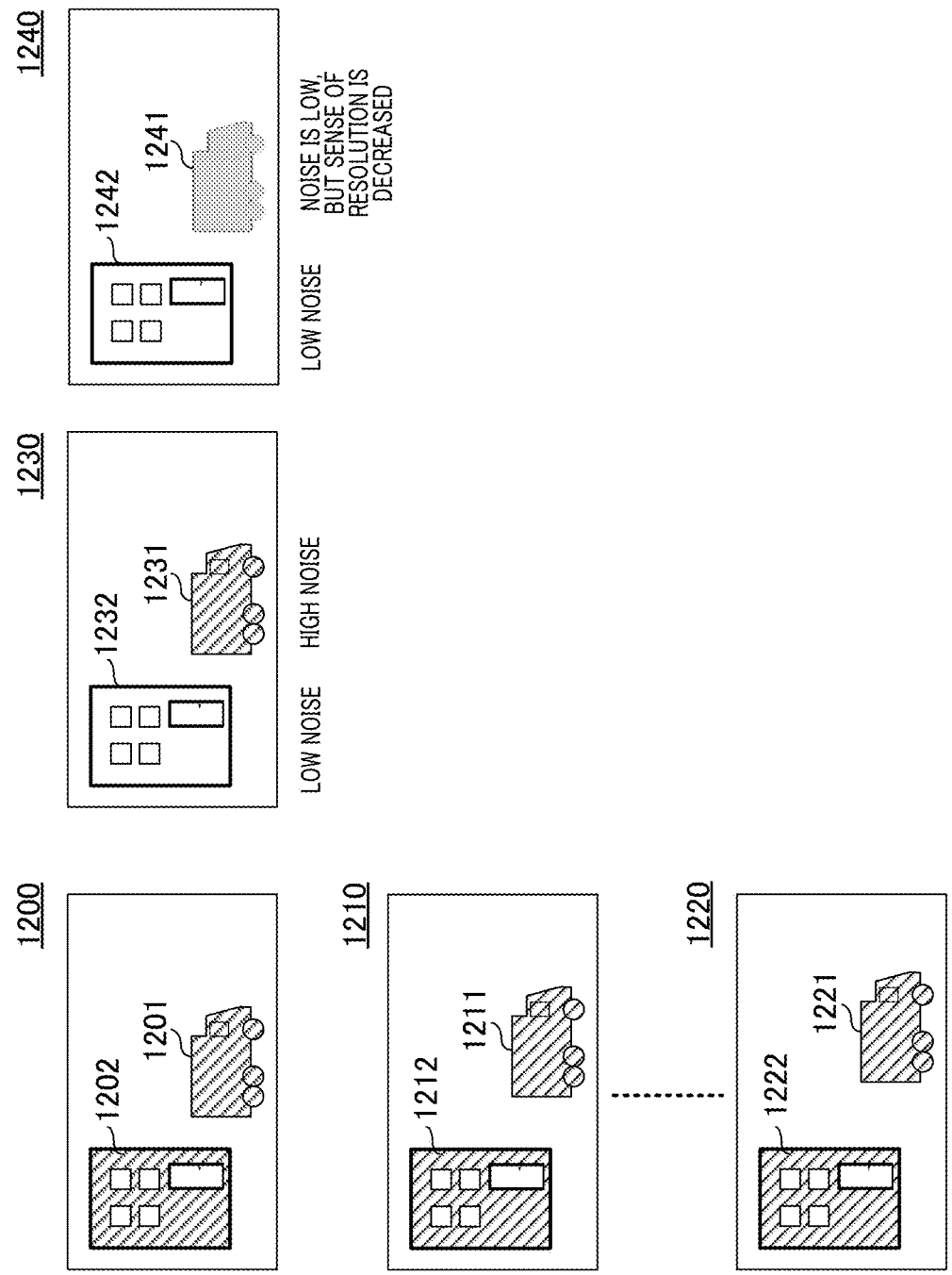

IMAGE PROCESSING DEVICE CAPABLE OF SYNTHESIZING IMAGES, IMAGE PROCESSING METHOD, AND STORAGE MEDIUM

BACKGROUND OF THE INVENTION

Field of the Invention

The present invention relates to an image processing device, an image processing method, a storage medium, and the like for synthesizing a plurality of images and reducing noise.

Description of the Related Art

In order to obtain an image with little noise, it is effective to secure a sufficient exposure time. However, when an exposure time increases, there is a problem that an image blurs due to the movement of a camera due to a camera shake or the movement of a subject.

Consequently, an electronic blur correction method has been proposed as a method of coping with such blurring. For example, in Japanese Patent Application Laid-Open No. H9-261526, imaging is performed a plurality of times continuously for a short exposure time with little blurring, and alignment processing is performed such that movement between a plurality of images obtained is cancelled.

A method of obtaining an image with no blurring and little noise by performing synthesis processing thereafter has been proposed. However, in the method disclosed in Japanese Patent Application Laid-Open No. H9-261526, the effect of reducing noise by synthesis varies depending on a difference in correlation between images.

FIG. 12 is a diagram illustrating an example of the related art, where reference numerals 1200, 1210, and 1220 denote input images, and reference numeral 1230 denotes a synthesized image. Subjects 1202, 1212, and 1222 that are stationary among a plurality of images (on which alignment processing disclosed in Japanese Patent Application Laid-Open No. H9-261526 has been performed) have a high correlation between the images and the noise reduction effect by synthesis is excellent.

On the other hand, the subjects 1201, 1211, and 1221 moving between a plurality of images have a low correlation between the images, and thus there are a low-noise subject 1232 and a high-noise subject 1231 as illustrated as the synthesized image 1230. That is, an image with noise variations (noise unevenness) is generated.

In addition, Japanese Patent Application Laid-Open No. 2012-68733 discloses the following technique as a technique for reducing noise unevenness in a synthesized image. First, a first mixing ratio is calculated based on the amount of correlation between a standard image and an image other than the standard image, and the standard image and the image other than the standard image are synthesized. Next, noise reduction is performed on the standard image and the synthesized image using predetermined parameters. Finally, a second mixing ratio is calculated in accordance with synthesis number information, and the standard image and the synthesized image, which have been subjected to noise reduction, are further synthesized.

However, in the configuration of Japanese Patent Application Laid-Open No. H9-261526, as the number of input images increases, a difference between a region with a large number of synthesized images and a region with a small number of synthesized images increases, and a difference in noise unevenness in the synthesized image 1230 also increases. Further, in the configuration disclosed in Japanese Patent Application Laid-Open No. 2012-68733, strong noise reduction is performed on the standard image in order to reduce noise unevenness.

For this reason, as in a synthesized image 1240, there is a problem in that a subject 1241 with a small number of synthesized images has a lower sense of resolution than that of a subject 1242 with a large number of synthesized images.

The present invention has been made in view of such circumstances, and one of the objects thereof is to provide an image processing device capable of generating a synthesized image that maintains a sense of resolution while suppressing noise unevenness.

SUMMARY OF THE INVENTION

An image processing device according to one aspect of the present invention includes at least one processor or circuit configured to function as: an acquisition unit configured to acquire a plurality of images, a calculation unit configured to calculate the amount of correlation between at least two images of the plurality of images, a synthesis unit configured to synthesize the plurality of images based on the correlation amount to generate a synthesized image, and a noise processing unit configured to reduce noise in the synthesized image based on the number of the plurality of images and the correlation amount.

Further features of the present invention will become apparent from the following description of embodiments with reference to the attached drawings.

BRIEF DESCRIPTION OF THE DRAWINGS

FIG. 12 is a diagram illustrating an example of the related art.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

In the embodiment, an example in which the image processing device is applied to a digital camera will be described. However, image processing devices include electronic devices with imaging functions such as smartphones with cameras, tablet computers with cameras, in-vehicle cameras, drone cameras, cameras mounted on robots, and network cameras.

First Embodiment

Note that, in a first embodiment, an example in which a noise-reduced image is generated by synthesizing a plurality of images captured by an image processing device 100 (digital camera) will be described.

Figure 1:
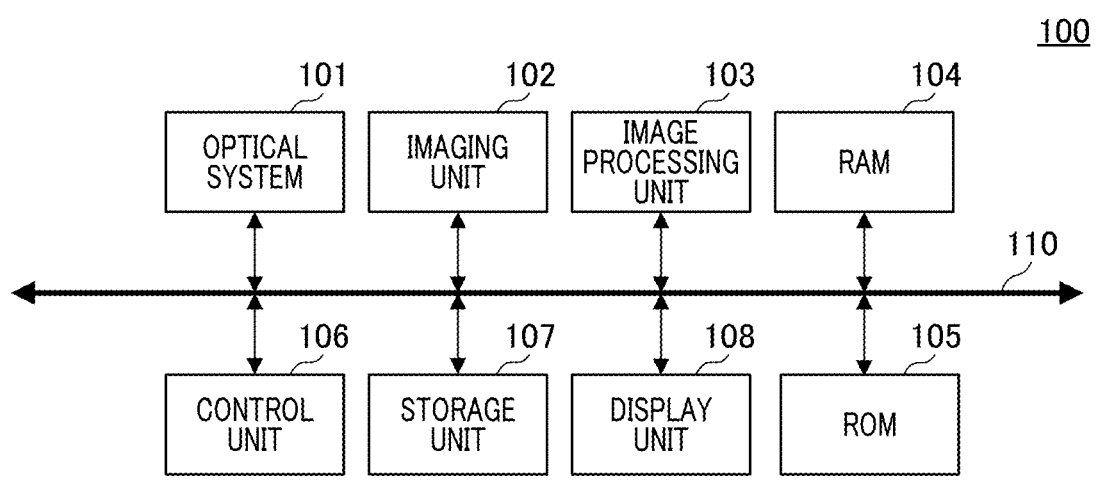
FIG. 1 is a hardware block diagram of an image processing device according to a first embodiment of the present invention.

FIG. 1 is a hardware block diagram of an image processing device according to the first embodiment of the present invention.

Reference numeral 101 denotes an optical system 101 that forms a subject image on an imaging unit 102. The imaging unit 102 is an imaging device such as a CCD or a CMOS sensor, performs photoelectric conversion of an optical image formed on an imaging element by the optical system 101, performs A/D conversion on an obtained analog image signal, outputs the obtained digital image data to a RAM 104, and stores it therein.

A control unit 106 includes a CPU as a computer, reads an operation program for each block included in the image processing device 100 from a ROM 105 as a storage medium, develops the operation program in the RAM 104, and executes the operation program. Thereby, the control unit 106 controls the operation of each block included in the image processing device 100. In addition, the control unit 106 instructs the optical system 101 on a lens driving amount, so that images can be captured at different in-focus positions.

In addition, the ROM 105, which is a rewritable non-volatile memory, stores parameters required for the operation of each block, in addition to computer programs for controlling the operation of each block included in the image processing device 100. The RAM 104, which is a rewritable volatile memory, is used as a temporary storage area for data which is output during the operation of each block included in the image processing device 100.

The image processing unit 103 applies various image processing such as white balance adjustment, color interpolation, reduction/enlargement, filtering, and the like to image data stored in the RAM 104. In addition, the image processing unit 103 also performs image synthesis, which will be described later.

A recording unit 107 records an image stored in the RAM 104 and processed by the image processing unit 103 as a recorded image or a synthesized image.

A display unit 108 is, for example, a rear liquid crystal and displays images recorded in the RAM 104. Note that the display unit 108 may be separate from the image processing device.

Figure 2:
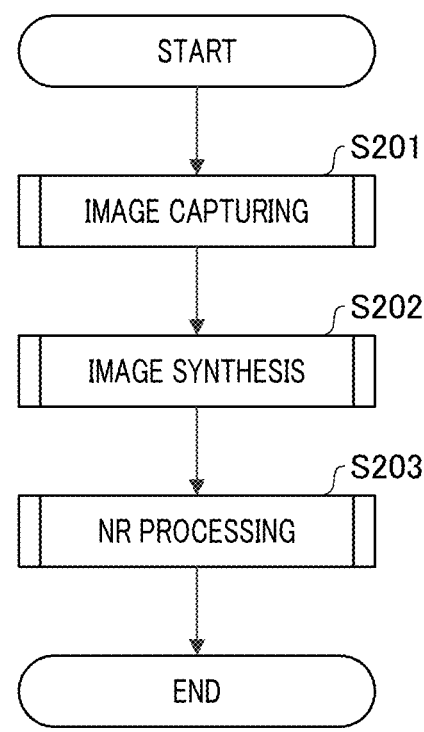
FIG. 2 is an overall processing flowchart of the image processing device according to the first embodiment.
Figure 3:
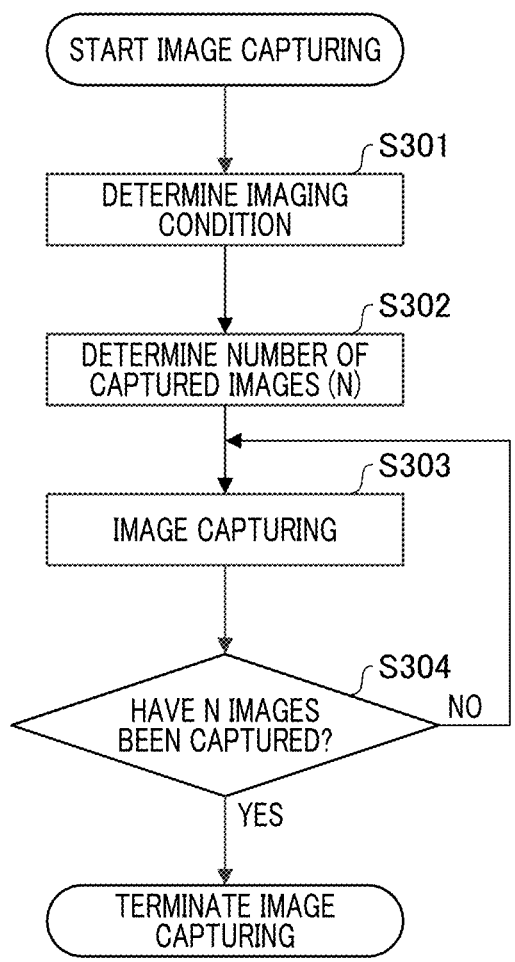
FIG. 3 is a detailed flowchart illustrating step S201.
Figure 4:
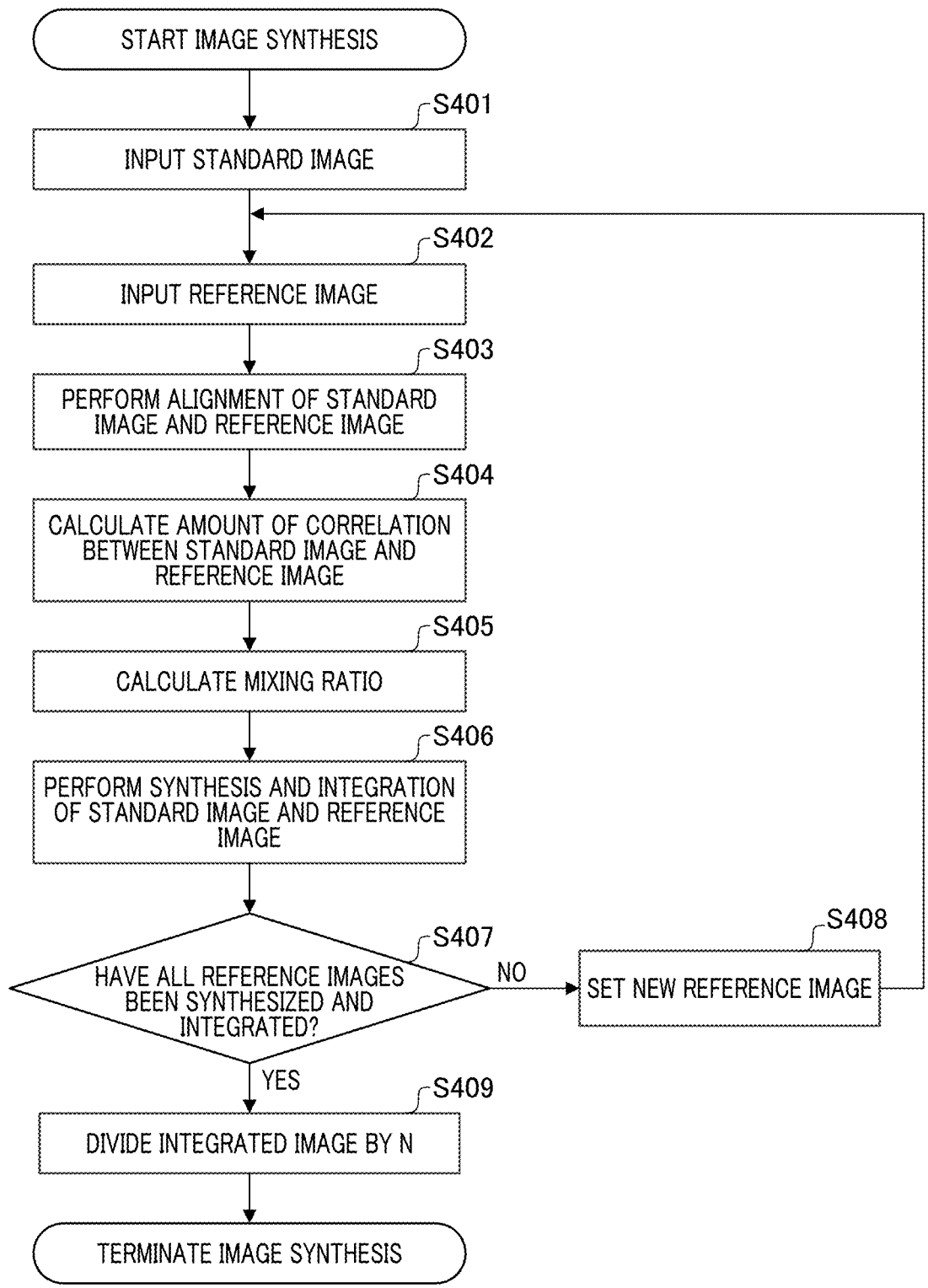
FIG. 4 is a detailed flowchart illustrating step S202.
Figure 6A:
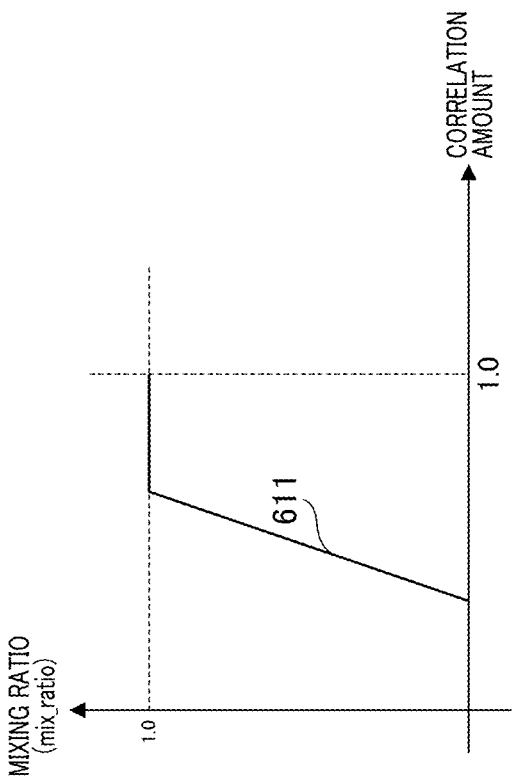
FIG. 6A is a diagram illustrating an example of a relationship between a difference amount and a correlation amount in a correlation amount calculation unit 502.
Figure 6B:
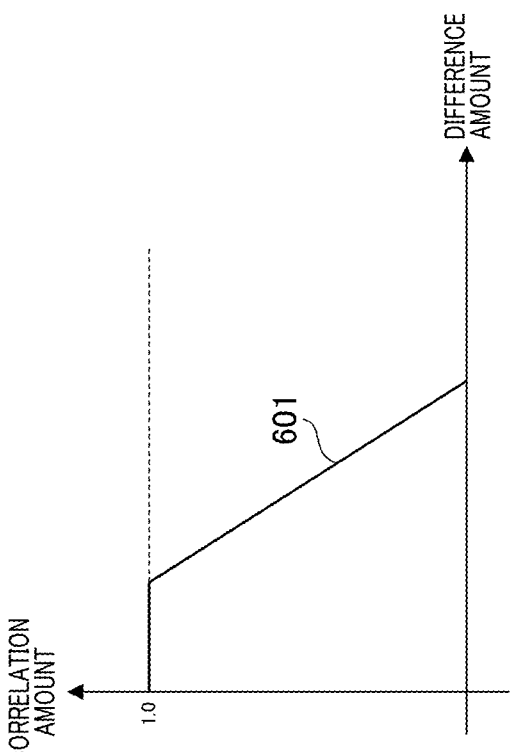
FIG. 6B is a diagram illustrating an example of a relationship between a correlation amount and a mixing ratio in a mixing ratio calculation unit 504.
Figure 7:
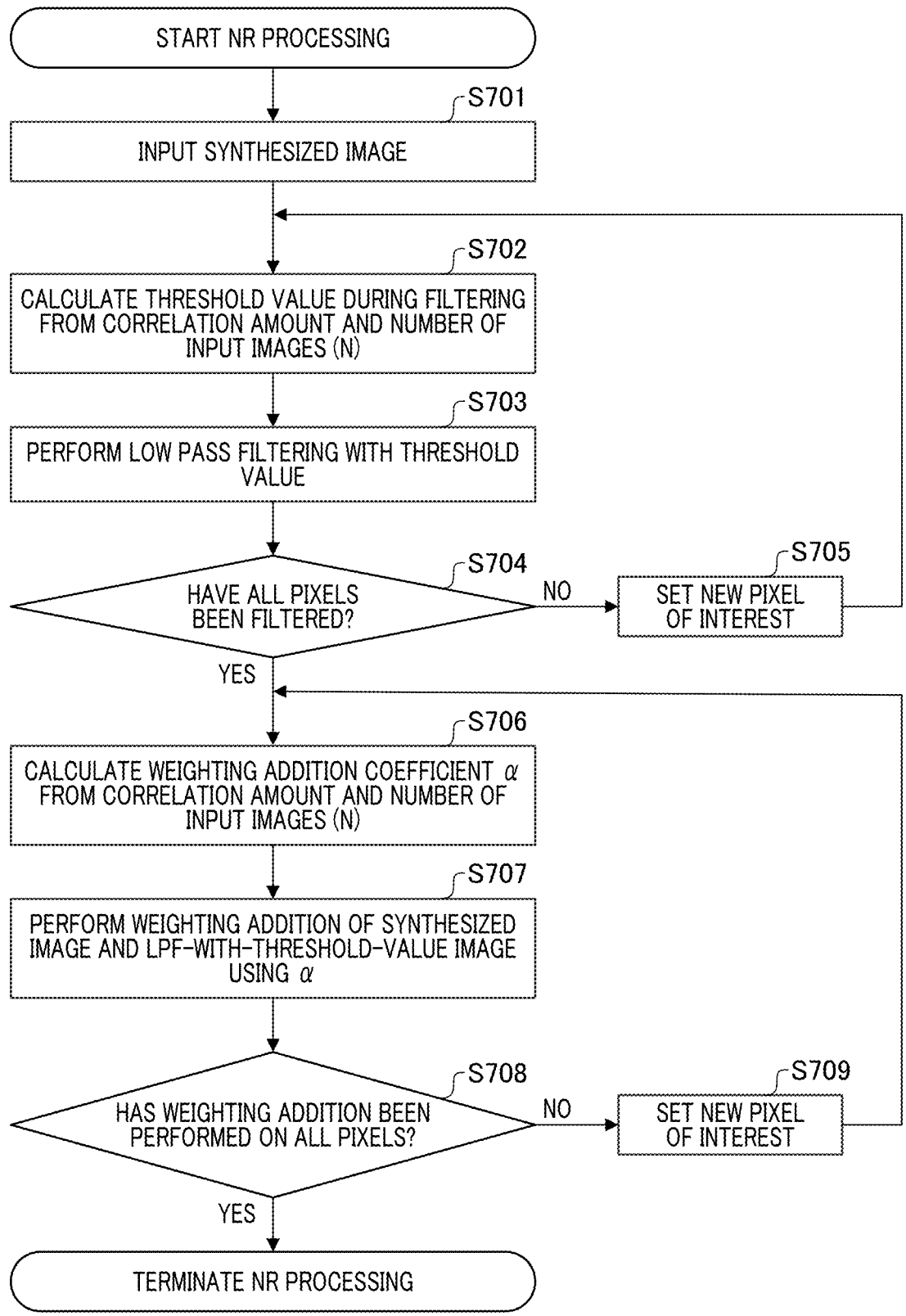
FIG. 7 is a detailed flowchart illustrating step S203.

Next, operations of the first embodiment will be described using FIGS. 2 to 10. FIG. 2 is an overall processing flowchart of the image processing device according to the first embodiment, FIG. 3 is a detailed flowchart illustrating step S201, FIG. 4 is a detailed flowchart illustrating step S202, and FIG. 7 is a detailed flowchart illustrating step S203.

Note that operations of steps in the flowcharts of FIGS. 2 to 4 and FIG. 7 are performed by causing a CPU serving as a computer in the control unit 106 to execute the computer programs stored in the memory.

FIG. 2 illustrates a series of processes for synthesizing a plurality of captured images to generate a noise-reduced image in the image processing device.

In step S201, the control unit 106 captures a plurality of images by the imaging unit 102. In step S202, the control unit 106 synthesizes each image by the image processing unit 103. In step S203, the control unit 106 performs noise reduction (NR) processing on a synthesized image by the image processing unit 103. These steps will be described in detail.

Imaging in step S201 will be described with reference to FIG. 3. In step S301, the control unit 106 determines imaging conditions. The imaging conditions include a shutter speed, an aperture value, an ISO sensitivity, and the like, and are automatically determined based on photometry results of the image processing device 100, or arbitrarily set by a photographer depending on a subject to be imaged. Alternatively, a shutter speed and an aperture value related to depth representation and the like may be determined by the photographer, and an ISO sensitivity may be automatically determined based on photometry results of the image processing device 100.

In step S302, the control unit 106 determines the number of captured images (N). The number of captured images (N) can be set by the image processing device 100 depending on, for example, how many stages of noise reduction effect are to be performed, or can be arbitrarily set by the photographer depending on a subject to be imaged. Further, it is assumed that all of the N images are captured under the same imaging conditions.

In step S303, the control unit 106 operates the imaging unit 102 under the imaging conditions set in step S301 to capture an image.

In step S304, the control unit 106 terminates imaging when the number of captured images reaches the number of captured images (N) set in step S302. When the number of captured images is less than the number of captured images (N), the processing returns to step S303, and the processing from step S303 to step S304 is repeated. Here, steps S303 and S304 function as an acquisition step (acquisition unit) for acquiring a plurality of images.

Figure 5:
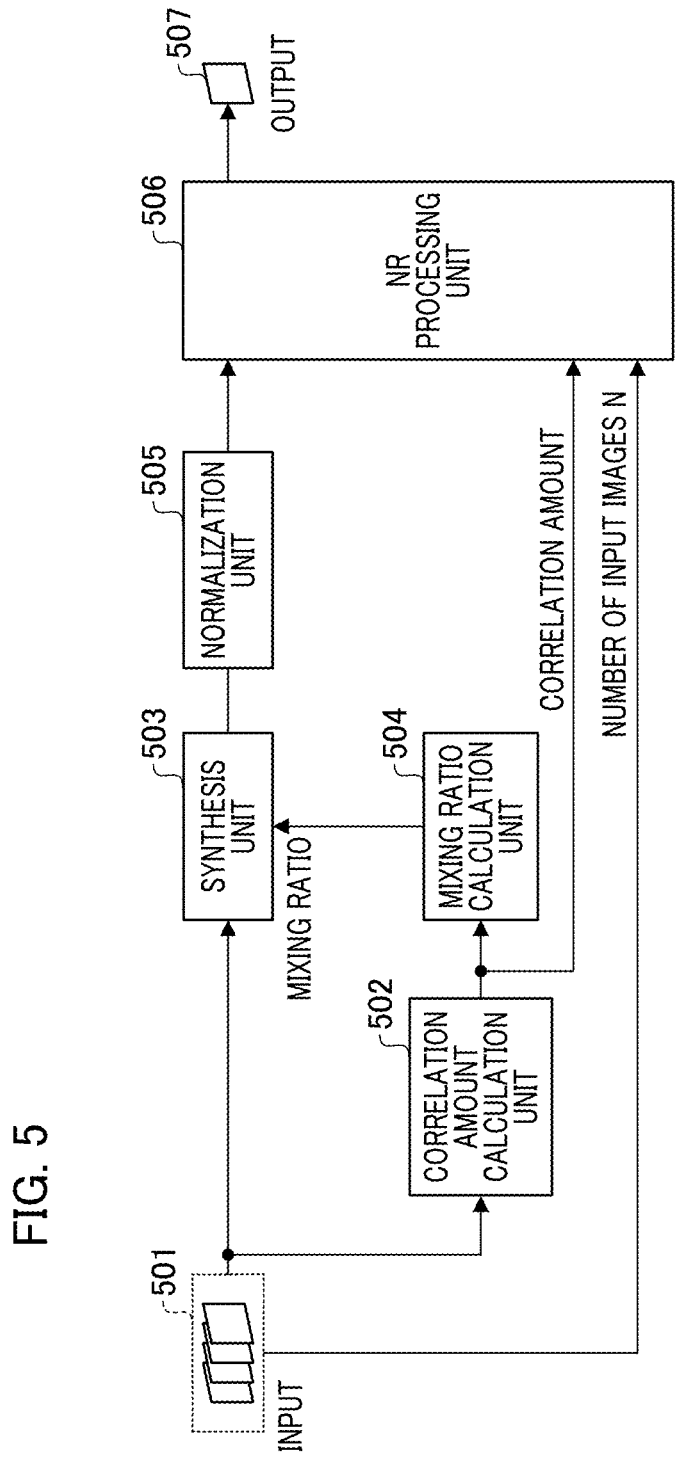
FIG. 5 is a functional block diagram of an image processing unit 103 in the first embodiment.

Next, the image synthesis processing in step S202 in FIG. 2 will be described with reference to FIGS. 4 and 5. FIG. 5 is a functional block diagram of the image processing unit 103 in the first embodiment. Note that some of the functional blocks illustrated in FIG. 5 are realized by causing a computer, not illustrated in the drawing, which is included in the control unit 106 of the image processing device to execute a computer program stored in a ROM or the like as a storage medium.

However, some or all of them may be realized by hardware. As the hardware, a dedicated circuit (ASIC), a processor (reconfigurable processor, DSP), or the like can be used.

In addition, the functional blocks illustrated in FIG. 1 may not be built in the same housing, or may be constituted by separate devices connected to each other via signal paths. Note that the above description regarding FIG. 5 also applies to FIG. 8 to be described later.

In step S401, the control unit 106 inputs a standard image to be a synthesis standard among captured images as an input 501 in FIG. 5. The selection of the standard image is arbitrary, but a close leading image may be selected at a timing when a shutter may be pressed.

In step S402, the control unit 106 inputs a reference image to be a synthesis target image among the captured images as the input 501 in FIG. 5. The reference image is an image other than the standard image determined in step S401.

In step S403, the control unit 106 aligns the reference image with the standard image. This is because a noise reduction effect is low even when the standard image and the reference image are synthesized in a state where the positions thereof are shifted due to a camera shake or local moving objects.

For example, the following method can be used to adjust a deviation between images due to a camera shake or the like. First, a plurality of motion vectors are calculated between the standard image and the reference image. A known technique such as template matching may be used to calculate the motion vectors. Next, a transformation coefficient of affine transformation or projective transformation that satisfies the plurality of calculated motion vectors is calculated, and the transformation coefficient is optimized using a least squares method so that an error between a movement amount according to the transformation coefficient and the motion vector is minimized.

Thereby, it is possible to calculate a highly accurate transformation coefficient. Finally, it is possible to perform alignment with the standard image by transforming the reference image by using the transformation coefficient. In addition, since it is desirable to align the positions of the local moving objects as much as possible to synthesize them, the positions of the local moving objects may be further aligned using a template matching technique or the like after performing alignment between images.

In step S404, the control unit 106 calculates the amount of correlation between the standard image and the reference image using a correlation amount calculation unit 502 in FIG. 5. Here, step S404 functions as a calculation step (calculation unit) for calculating the amount of correlation between at least two images of the plurality of images.

In order to calculate the correlation amount, for example, a difference from a block in a predetermined range centered on a pixel of interest, or a difference value of each frequency component obtained by transforming the block on a frequency space is calculated. FIG. 6A is a diagram illustrating an example of a relationship between a difference amount and a correlation amount in the correlation amount calculation unit 502, and a relationship is established such that the smaller a difference, the larger a correlation amount, and the larger a difference, the smaller the correlation amount.

In addition, since the value range of the difference amount changes depending on a bit length of an input signal, it is normalized to 1.0 as illustrated in FIG. 6A. Note that, in the example of FIG. 6A, the correlation amount with respect to the difference is adjusted by using a polygonal line 601, but the present invention is not limited to this example. Since the correlation amount is used for filter control in the NR processing unit 506 in FIG. 5, a correlation amount calculated in all reference images is divided by the number of reference images and normalized to 1.0.

In step S405 the control unit 106 calculates a mixing ratio based on the correlation amount by the mixing ratio calculation unit 504 in FIG. 5. FIG. 6B is a diagram illustrating an example of a relationship between the correlation amount and the mixing ratio in the mixing ratio calculation unit 504. As denoted by reference numeral 611 in FIG. 6B, when the correlation is high, a mixing ratio (mix_ratio) is set to be high to reduce noise, and thus the mixing ratio is set to be close to 1.0.

On the other hand, when the correlation is low, a mixing ratio is set to be low to suppress a multiple image (artifact) of a subject, and thus so that the mixing ratio is set to be close to 0. However, the present invention is not limited to the characteristics as illustrated in FIG. 6B.

In step S406, the control unit 106 synthesizes and integrates the standard image and the reference image by a synthesis unit 503. Here, step S406 functions as a synthesis step (synthesis unit) for synthesizing a plurality of images based on the correlation amount to generate a synthesized image. A mixing ratio is the mixing ratio calculated in step S405, and the synthesis is performed using the following Formula (1), and the integration is performed using the following Formula (2).

$$\text{Synthesized image } [N] = \qquad (1)$$
$$(1, 0 - \text{mix\_ratio}) \times \text{Standard image} + \text{mix\_ratio} \times \text{Reference image } [N]$$
$$\text{Integrated image} = \left( \text{Standard image} + \sum_{1}^{N-1} \text{Synthesized image } [N] \right) \qquad (2)$$

Here, an example in which four images (N=4) are synthesized based on Formulas (1) and (2) will be described. Here, the four images include one standard image (N=0) and three reference images (N=1, 2, 3). For example, when the standard image and a first (N=1) reference image are synthesized on the assumption that a correlation amount is low and a mixing ratio (mix_ratio) is set to 0, a synthesized image [1] is output as a standard image.

Similarly, when a mix_ratio is set to 0 for second and third images, a synthesized image [2] and a synthesized image [3] are output as reference images. For this reason, a synthesized image (integrated image) is obtained by integrating four reference images.

In contrast, when a correlation amount is high, and a mixing ratio (mix_ratio) is set to 1.0 in all of the reference images, an image obtained by adding four images including a standard image and three reference images is output. In this manner, in the first embodiment, by changing a mixing ratio depending on a correlation amount, a region where noise is reduced by synthesis and a region where noise is not reduced (a region where no artifacts occur) are generated.

In step S407, the control unit 106 determines whether synthesis and integration have been performed for all of the reference images. When the synthesis and the integration have been terminated for all of the images, the processing proceeds to step S409. When it is determined in step S407 that there is an image for which synthesis and integration have not been performed, the processing proceeds to step S408 to set a new reference image, and the processing from step S402 to step S406 is repeated until synthesis and integration are terminated for all of the images.

In step S409, the control unit 106 normalizes the synthesized image (integrated image) using the following Formula (3) by a normalization unit 505.

$$\text{Normalized image} = \text{Integrated image}/N \qquad (3)$$

That is, since the synthesized image (integrated image) output from the synthesis unit 503 is obtained only by performing integration by the number of input images, a final normalized synthesized image can be obtained by dividing the integrated image by the number of input images. Details of the processing of an image synthesis step S202 have been described so far.

Figure 8:
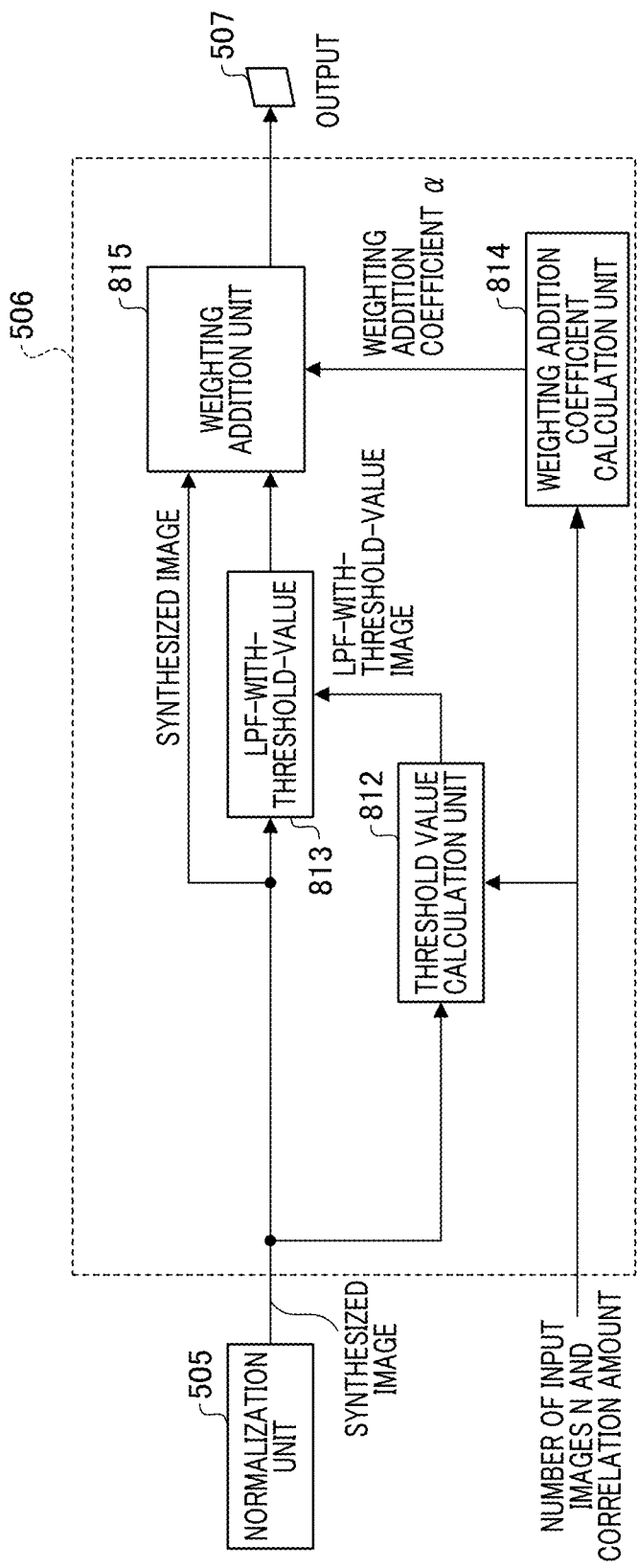
FIG. 8 is a functional block diagram illustrating a configuration of an NR processing unit 506.

Next, noise reduction (NR) processing in step S203 will be described using FIGS. 7 to 9. Note that the NR processing is performed by the NR processing unit 506 in FIG. 5. In addition, FIG. 8 is a functional block diagram illustrating a configuration of the NR processing unit 506. In addition, FIGS. 9A and 9B are diagrams illustrating a filter threshold value.

In step S701, the control unit 106 inputs the synthesized image from the normalization unit 505 to the NR processing unit 506. In step S702, a threshold value calculation unit 812 calculates a threshold value during filtering from a correlation amount and the number of input images (N). Further, in step S703, the synthesized image is subject to low-pass filtering (smoothing) by a low-pass filter (LPF)-with-threshold-value 813. This processing will be described in detail below with reference to FIGS. 9A and 9B. Note that a signal value of a pixel is set to 8 bits (0 to 255).

Figure 9A:
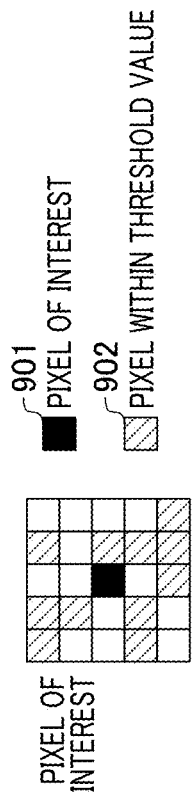
FIG. 9A is a diagram illustrating an LPF-with-threshold-value 813.
Figure 9B:
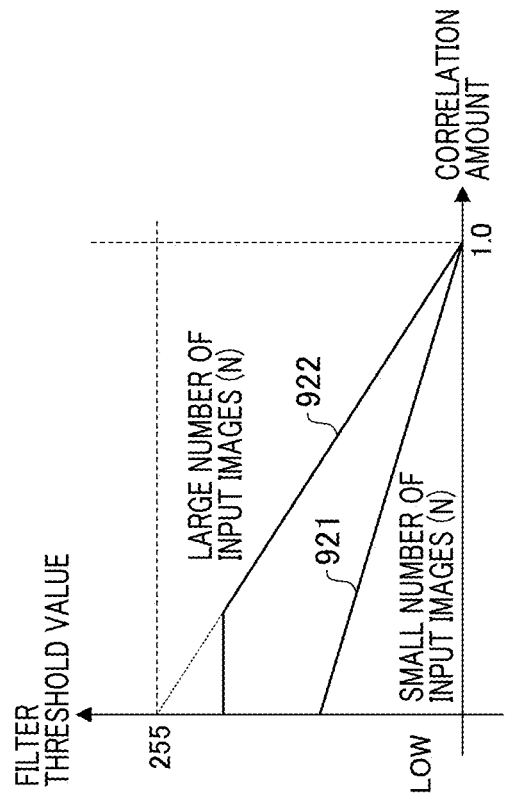
FIG. 9B is a diagram illustrating an example of a relationship between a correlation amount and a filter threshold value.

FIG. 9A is a diagram illustrating the LPF-with-threshold-value 813.

As illustrated in FIG. 9A, the LPF-with-threshold-value 813 performs filtering using pixels within a predetermined range centered on a pixel of interest 901, that is, within a predetermined filter size (for example, 5 pixels×5 pixels).

At this time, when filtering is performed using all pixels within a predetermined range, a sense of resolution of an edge component or the like is lost, and thus a difference between the pixel of interest 901 and the reference image is compared with a filter threshold value, and filtering is performed using pixels 902 in which the difference is within a threshold value. That is, filtering is performed with pixels in which a difference between a pixel of interest and each pixel within a predetermined filter size is within a predetermined filter threshold value.

For example, when the filter threshold value is increased here, filtering is performed using many pixels, and a filter strength is increased. Thus, noise is reduced, but a sense of resolution is likely to be lost. In contrast, when the filter threshold value is decreased, a filter strength is decreased, and a sense of resolution is improved, but a noise reduction effect is reduced.

Next, a method of determining the above-described filter threshold value will be described using FIG. 9B. FIG. 9B is a diagram illustrating an example of a relationship between a correlation amount and a filter threshold value in the first embodiment, where the horizontal axis represents a correlation amount calculated by the correlation amount calculation unit 502, and the vertical axis represents a filter threshold value.

As described above, a correlation amount is obtained by integrating correlation amounts calculated for all reference images and is normalized to 1.0. For example, a value obtained by integrating the correlation amounts calculated for all reference images is divided by the number of reference images (N-1).

Reference numeral 911 denotes a characteristic when the number of input images is small, and reference numeral 912 denotes a characteristic when the number of input images is large. When a correlation amount is large, a mixing ratio is increased as illustrated in FIG. 6B, and thus the necessity of performing NR processing using a filter is reduced. Thus, both the characteristics 911 and 912 are set such that a filter threshold value approaches 0 (that is, NR processing is not performed) as a correlation amount increases, and both the characteristics are set such that a filter threshold value increases (a filter strength increases) as a correlation amount decreases.

In addition, as the number of input images increases, more images are synthesized in a region with a large correlation amount, and thus noise unevenness (noise difference) between a region with a large correlation amount and a region with a small correlation amount increases. For this reason, it is possible to reduce noise unevenness by setting a filter threshold value to become larger (setting a filter strength to become higher) in the characteristic 912 when the number of input images is large than in the characteristic 911 even with the same correlation amount.

Figure 9C:
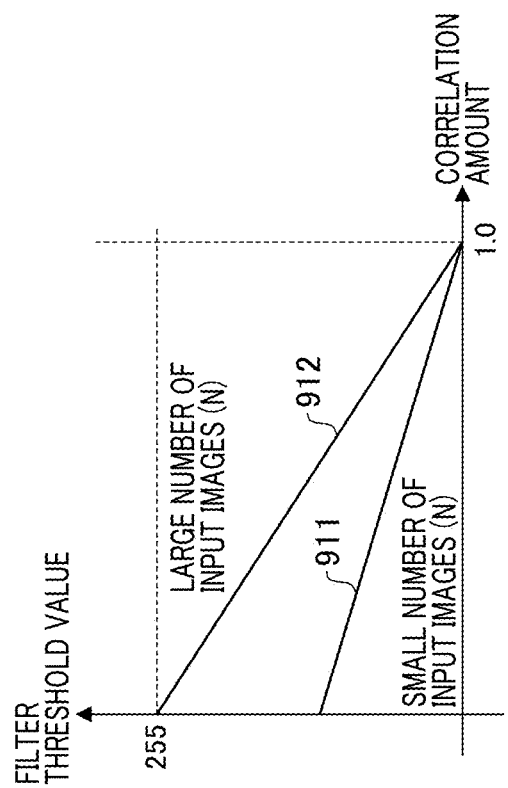
FIG. 9C is a diagram illustrating another example of a relationship between a correlation amount and a filter threshold value.

In addition, a relationship between the correlation amount and the filter threshold value may be set as illustrated in FIG. 9C. FIG. 9C is a diagram illustrating another example of a relationship between a correlation amount and a filter threshold value. The vertical axis and the horizontal axis are the same as in FIG. 9B, and characteristics 921 and 922 correspond to the characteristics 911 and 912, respectively.

However, in FIG. 9C, in the case of the characteristic 922 with a large number of input images, a filter threshold value has an upper limit. This is because there is a possibility that a sense of resolution is significantly reduced when noise unevenness is reduced excessively. That is, in FIG. 9C, a reduction in a sense of resolution is suppressed by providing an upper limit.

In step S704, when filtering is performed for all pixels, the processing proceeds to step S706, and otherwise, the processing proceeds to step S705 to set a new pixel of interest, and then the processing of steps S702 and S703 is repeated. Here, steps S702 to S705 function as a noise processing step (noise processing unit) for reducing noise in the synthesized image based on the number of plurality of images and a correlation amount.

In step S706, a weighting addition coefficient calculation unit 814 calculates a weighting addition coefficient α based on the correlation amount and the number of input images. In step S707, a weighting addition unit 815 performs weighting addition of a synthesized image and an LPF-with-threshold-value image using the weighting addition coefficient α which is a predetermined ratio.

That is, the weighting addition unit 815 performs weighting addition of the synthesized image and the LPF-with-threshold-value image, which is an output of the LPF-with-threshold-value 813, using the weighting addition coefficient α according to Formula (4) below.

$$\text{Output image} = \alpha \times \text{Synthesized image} + (1.0-\alpha) \times \text{LPF-with-threshold-value image} \qquad (4)$$

This is to reduce noise unevenness in the LPF-with-threshold-value image, and at the same time, to compensate for the lost sense of resolution by performing weighting addition of the synthesized image from the normalization unit 505. In addition, as the weighting addition coefficient α becomes closer to 1.0, an output ratio of the synthesized image becomes higher, and thus it is possible to compensate for a sense of resolution.

Figure 10:
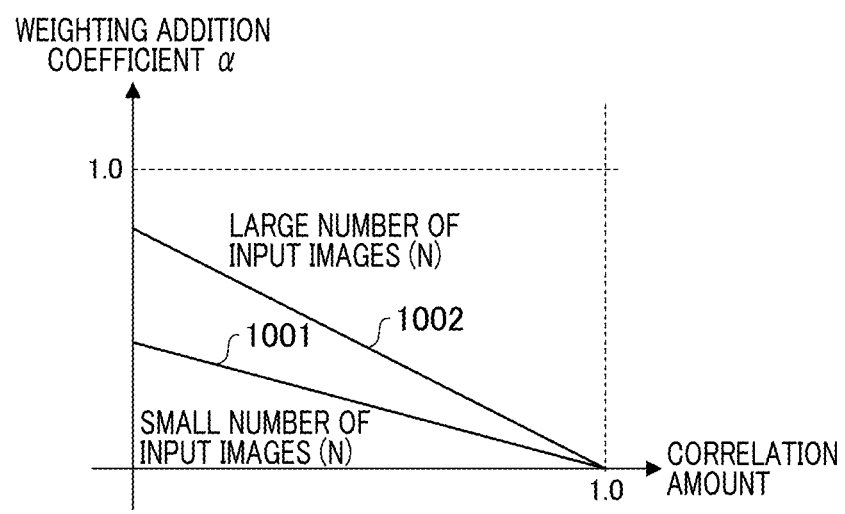
FIG. 10 is a diagram illustrating an example of a relationship between a correlation amount and a weighting addition coefficient α.

Next, the weighting addition coefficient calculation unit 814 will be described with reference to FIG. 10. FIG. 10 is a diagram illustrating an example of a relationship between a correlation amount and a weighting addition coefficient α, where the horizontal axis represents the amount of correlation between a standard image and a reference image which is calculated by the correlation amount calculation unit 502, and the vertical axis represents a weighting addition coefficient α.

Reference numeral 1001 denotes a characteristic when the number of input images is small, and reference numeral 1002 denotes a characteristic when the number of input images is large. For both the characteristics 1001 and 1002, the weighting addition coefficient α increases as the correlation amount decreases, and thus an output ratio of a synthesized image increases.

As described above, when a correlation amount is small, a filter threshold value of an LPF-with-threshold-value image is large, and thus noise can be reduced, but a sense of resolution is also lost. Consequently, it is possible to compensate for the lost sense of resolution by increasing the weighting addition coefficient α.

Although an output ratio of the LPF-with-threshold-value image increases as the correlation amount increases, a filter strength of the LPF-with-threshold-value 813 decreases as the correlation amount increases as described above. That is, since the sense of resolution can be maintained, the amount of compensation for resolution by a synthesized image may be small.

When the correlation amount is set to 1.0, the weighting addition coefficient is set to 0, and an LPF-with-threshold-value image is output at a rate of 100%. However, as described above, when the correlation amount is 1.0, LPF processing with a threshold value is not performed, and thus it is not necessary to compensate for the resolution with a synthesized image. Further, when the LPF processing with a threshold value is not performed, the synthesized image and the LPF-with-threshold-value image are the same image as a result, and thus the synthesized image is output 100%.

In step S708, when the control unit 106 determines that weighting addition processing has been performed for all pixels, the NR processing is terminated. When the weighting addition processing has not been performed for all pixels, the processing proceeds to step S709 to set a new pixel of interest, and then the processing of steps S706 and S707 is repeated.

In this manner, in the first embodiment, the smaller the number of plurality of images, and the higher the amount of correlation between the plurality of images, the lower a filter strength in a low-pass filter, and an output ratio of a synthesized image in weighting addition means is decreased.

The detailed operations of the NR processing step S203 have been described so far. When all of the operations are terminated, an output image 507 in FIG. 8 is generated. In the above description, processing in units of pixels has been described, but processing in units of blocks may be performed to reduce a calculation amount.

That is, block dividing means for dividing an image into blocks having a predetermined size may be provided. In addition, the correlation amount calculation unit 502, the synthesis unit 503, and the NR processing unit 506 as noise processing means may perform processing in units of the blocks.

At that time, in order to suppress deterioration in image quality due to sudden changes in various information (a correlation amount, a mixing ratio, an LPF strength-with-threshold-value, a weighting addition coefficient) between adjacent blocks, it is desirable to smooth and use various values between the adjacent blocks.

Note that an image which is input to the image processing device of the first embodiment may be a RAW signal before development, a YUV signal after development processing, or the like, and is not limited to a format, a color space, a signal bit length, and the like.

Second Embodiment

In a second embodiment, a filter size of the LPF-with-threshold-value 813 in FIG. 8 is changed depending on the number of input images and a correlation amount. In addition, the processing of steps S702 and S703 in the processing flow of FIG. 7 is changed.

Control in the second embodiment will be described below in detail with reference to FIG. 11.

Figure 11A:
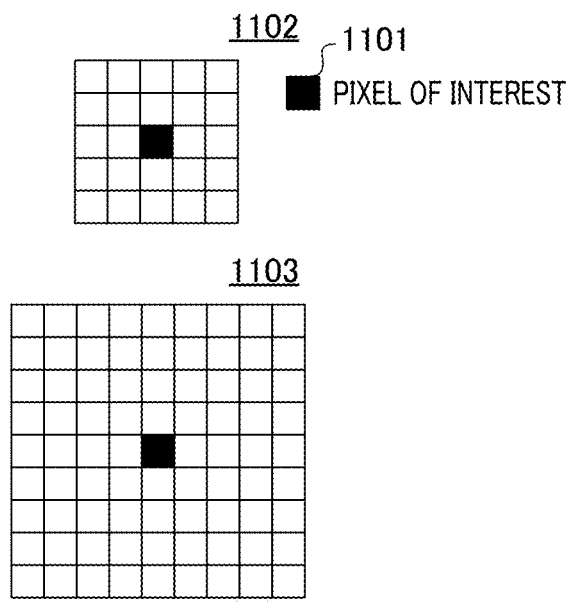
FIG. 11A is a diagram illustrating an example of a change in a filter size centering on a pixel of interest in a second embodiment.

FIG. 11A is a diagram illustrating an example of a change in a filter size centered on a pixel of interest in the second embodiment, and reference numeral 1101 denotes a pixel of interest. Reference numeral 1102 denotes an example of a filter having a relatively small size centered on the pixel of interest 1101, a noise reduction effect is reduced, but a sense of resolution can be maintained. On the other hand, reference numeral 1103 is an example of a filter having a relatively large size centered on the pixel of interest 1101, a noise reduction effect is increased, but a sense of resolution is likely to be lost.

Figure 11B:
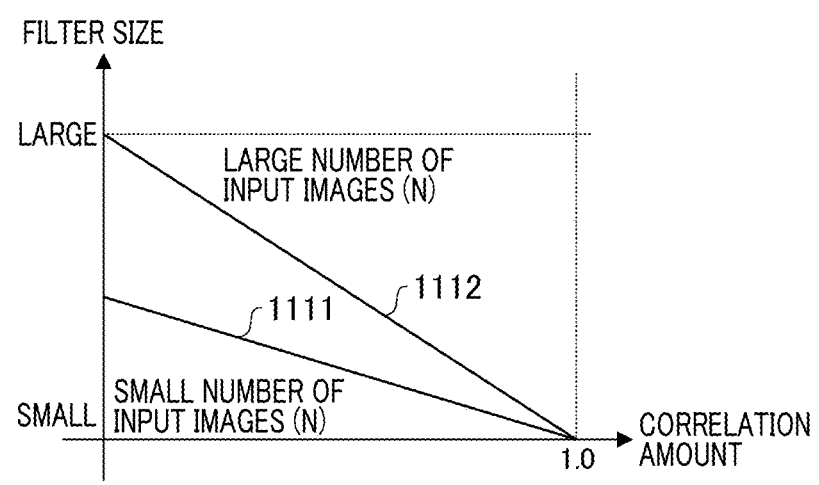
FIG. 11B is a diagram illustrating an example of a relationship between a correlation amount and a filter size.

FIG. 11B is a diagram illustrating an example of a relationship between a correlation amount and a filter size. In the second embodiment, a filter size is controlled based on a correlation amount and the number of input images in a relationship illustrated in FIG. 11B. The horizontal axis represents the amount of correlation between a standard image and a reference image which is calculated by the correlation amount calculation unit 502, and the vertical axis represents the degree of a filter size. Reference numeral 1111 denotes a characteristic when the number of input images is small, and reference numeral 1112 denotes a characteristic when the number of input images is large.

For both the characteristics 1111 and 1112, when a correlation amount is large, a mixing ratio is high, and thus it is not necessary to perform NR processing, and a filter threshold value is set to 0 (that is, NR processing is not performed).

Note that a larger number of images are synthesized in a region in which a correlation amount increases as the number of input images increases, and thus a signal to noise difference (noise unevenness) between a region with a large correlation amount and a region with a small correlation amount increases.

Consequently, in the second embodiment, a filter size is increased as a correlation amount decreases, and thus noise unevenness can be reduced by setting a filter size to become larger in the characteristic 1112 than in the characteristic 1111 even with the same correlation amount.

That is, in the flowchart of FIG. 7, in step S702, a filter size is changed as illustrated in FIG. 11 from a correlation amount and the number of input images, and a threshold value during filtering is calculated. Thereby, noise unevenness corresponding to a correlation amount can be suppressed. As described above, in the second embodiment, a synthesized image with little noise unevenness can be obtained by changing a filter size depending on a correlation amount and the number of input images.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image processing device through a network or various storage media. Then, a computer (or a CPU, an MPU, or the like) of the image processing device may be configured to read and execute the program. In such a case, the program and the storage medium storing the program configure the present invention.

This application claims the benefit of Japanese Patent Application No. 2022-071171, filed on Apr. 22, 2022, which is hereby incorporated by reference herein in its entirety.

What is claimed is:

1. An image processing device comprising at least one processor or circuit configured to function as:
    an acquisition unit configured to acquire a plurality of images;
    a calculation unit configured to calculate the amount of correlation between at least two images of the plurality of images;
    a synthesis unit configured to synthesize the plurality of images based on the correlation amount to generate a synthesized image; and
    a noise processing unit configured to reduce noise in the synthesized image based on the number of plurality of images and the correlation amount,
    wherein the noise processing unit includes
        a low-pass filter that smooths the synthesized image, and
        a weighting addition unit configured to perform weighting addition of the synthesized image and an output of the low-pass filter at a predetermined ratio,
        wherein the noise processing unit increases a filter size of the low-pass filter as the amount of correlation between the plurality of images decreases or as the number of plurality of images increases.

2. The image processing device according to claim 1, further comprising:
    a block division unit configured to divide the image into blocks having a predetermined size,
    wherein the calculation unit, the synthesis unit, and the noise processing unit perform processing in units of the blocks.

3. The image processing device according to claim 1, wherein the low-pass filter performs filtering with pixels in which a difference between a pixel of interest and each pixel within a predetermined filter size is within a predetermined filter threshold value.

4. The image processing device according to claim 3, wherein the noise processing unit increases the filter threshold value in the low-pass filter as the number of plurality of images increases.

5. The image processing device according to claim 3, wherein the noise processing unit further increases the filter threshold value in the low-pass filter as the amount of correlation between the plurality of images decreases.

6. The image processing device according to claim 1, wherein the noise processing unit performs control so that an output ratio of the synthesized image in the weighting addition unit becomes higher as the amount of correlation between the plurality of images decreases.

7. The image processing device according to claim 5, wherein the noise processing unit decreases a filter strength in the low-pass filter and decreases an output ratio of the synthesized image in the weighting addition unit as the number of plurality of images decreases or as the amount of correlation between the plurality of images increases.

8. An image processing method comprising:
    acquiring a plurality of images;
    calculating the amount of correlation between at least two images of the plurality of images;
    synthesizing the plurality of images based on the correlation amount to generate a synthesized image; and
    reducing noise in the synthesized image based on the number of plurality of images and the correlation amount,
    wherein the reducing noise includes
        smoothing the synthesized image using a low-pass filter, and
        performing weighting addition of the synthesized image and an output of the low-pass filter at a predetermined ratio,
        wherein increasing a filter size of the low-pass filter as the amount of correlation between the plurality of images decreases or as the number of plurality of images increases.

9. A non-transitory computer-readable storage medium configured to store a computer program comprising instructions for executing following processes:
    acquiring a plurality of images;
    calculating the amount of correlation between at least two images of the plurality of images;
    synthesizing the plurality of images based on the correlation amount to generate a synthesized image; and
    reducing noise in the synthesized image based on the number of plurality of images and the correlation amount,
    wherein the reducing noise includes
        smoothing the synthesized image using a low-pass filter, and
        performing weighting addition of the synthesized image and an output of the low-pass filter at a predetermined ratio,
        wherein increasing a filter size of the low-pass filter as the amount of correlation between the plurality of images decreases or as the number of plurality of images increases.

10. An image processing device comprising at least one processor or circuit configured to function as:
    an acquisition unit configured to acquire a plurality of images;
    a calculation unit configured to calculate the amount of correlation between at least two images of the plurality of images;
    a synthesis unit configured to synthesize the plurality of images based on the correlation amount to generate a synthesized image; and
    a noise processing unit configured to reduce noise in the synthesized image based on the number of plurality of images and the correlation amount,
    wherein the noise processing unit includes
    a low-pass filter that smooths the synthesized image, and
    a weighting addition unit configured to perform weighting addition of the synthesized image and an output of the low-pass filter at a predetermined ratio,
    wherein the noise processing unit performs control so that an output ratio of the synthesized image in the weighting addition unit becomes higher as the amount of correlation between the plurality of images decreases.

11. An image processing method comprising:
    acquiring a plurality of images;
    calculating the amount of correlation between at least two images of the plurality of images;

synthesizing the plurality of images based on the correlation amount to generate a synthesized image; and reducing noise in the synthesized image based on the number of plurality of images and the correlation amount, wherein the reducing noise includes smoothing the synthesized image using a low-pass filter, and performing weighting addition of the synthesized image and an output of the low-pass filter at a predetermined ratio, wherein performing control so that an output ratio of the synthesized image in the weighting addition becomes higher as the amount of correlation between the plurality of images decreases.

12. A non-transitory computer-readable storage medium configured to store a computer program comprising instructions for executing following processes:

acquiring a plurality of images;

calculating the amount of correlation between at least two images of the plurality of images;

synthesizing the plurality of images based on the correlation amount to generate a synthesized image; and reducing noise in the synthesized image based on the number of plurality of images and the correlation amount, wherein the reducing noise includes smoothing the synthesized image using a low-pass filter, and performing weighting addition of the synthesized image and an output of the low-pass filter at a predetermined ratio, wherein performing control so that an output ratio of the synthesized image in the weighting addition becomes higher as the amount of correlation between the plurality of images decreases.

\* \* \* \* \*